US005200267A

United States Patent [19]

Bauer et al

[11] Patent Number: 5,200,267

[45] Date of Patent: Apr. 6, 1993

[54] FIRE-RETARDANT SYNTHRETIC BOARD PRODUCT

[75] Inventor: Ted J. Bauer, Medford; David M. Harmon, Phoenix; both of Oreg.; Roy G. Kirwan, Pungaruan; Roberta Treliving, Woodland, both of United Kingdom

[73] Assignee: Medite Corporation, Medford, Oreg.

[21] Appl. No.: 792,033

[22] Filed: Nov. 13, 1991

Related U.S. Application Data

[60] Division of Ser. No. 668,068, Mar. 12, 1991, which is a continuation-in-part of Ser. No. 326,226, Mar. 20, 1989, Pat. No. 5,093,058.

[30] Foreign Application Priority Data

Mar. 14, 1990 [IE] Ireland .................................. 910/90

[51] Int. Cl.[5] ........................ B32B 23/14; B32B 21.04

[52] U.S. Cl. .................................... 428/326; 428/338; 428/375; 428/390; 428/537.1; 428/927

[58] Field of Search ............... 428/338, 375, 921, 390, 428/326, 537.1; 264/115

[56] References Cited

U.S. PATENT DOCUMENTS

| | | | |
|---|---|---|---|
| 2,199,087 | 4/1940 | Drill et al. | 49/1 |
| 2,757,115 | 7/1956 | Heritage | 428/338 |
| 2,757,150 | 1/1953 | Heritage | 260/17.2 |
| 2,872,337 | 2/1959 | Heritage et al. | 428/499 |
| 2,960,318 | 11/1960 | Caillaud | 259/9 |
| 3,179,341 | 4/1965 | Plos et al. | 239/414 |
| 3,190,618 | 6/1965 | Katzen | 259/4 |
| 3,297,603 | 1/1967 | Mase | 260/17.3 |
| 3,310,238 | 6/1965 | Bryant et al. | 239/132.3 |
| 3,398,019 | 8/1968 | Langguth | 427/226 |
| 3,428,592 | 2/1969 | Youker | 260/29.2 |
| 3,494,992 | 2/1970 | Wiegand | 264/121 |
| 3,636,199 | 1/1972 | Jenks et al. | 264/134 |
| 3,649,397 | 3/1972 | Peters | 156/62.2 |
| 3,752,398 | 8/1973 | Svensson | 239/1 |
| 3,874,990 | 4/1975 | Suroyk | 428/396 |
| 3,914,498 | 10/1975 | Videen | 428/290 |
| 3,916,825 | 11/1975 | Schnitzler et al. | 118/303 |
| 3,919,017 | 11/1975 | Shoemaker et al. | 156/62.2 |
| 3,930,110 | 12/1975 | Shoemaker et al. | 428/424 |

(List continued on next page.)

FOREIGN PATENT DOCUMENTS

| | | |
|---|---|---|
| 111149 | 7/1940 | Australia . |
| 0118659 A2 | 9/1984 | European Pat. Off. . |
| 0279416 B1 | 1/1992 | European Pat. Off. . |
| 3510646 A | 9/1986 | Fed. Rep. of Germany . |
| 63-242332 | 10/1988 | Japan . |
| 195185 | 10/1980 | New Zealand . |
| 191460 | 4/1981 | New Zealand . |

OTHER PUBLICATIONS

Gallagher, James "Urethane Bonded Particleboard", *Forest Products Jounral*, Apr. 1982, pp. 26–33.

(List continued on next page.)

*Primary Examiner*—P. C. Sluby
*Attorney, Agent, or Firm*—Klarquist, Sparkman, Campbell, Leigh & Whinston

[57] ABSTRACT

A method and apparatus for producing a synthetic board from cellulosic or lignocellulosic fibers is disclosed wherein a standard isocyanate binder is emulsified and immediately applied to the fibers before consolidation into a finished board product. The apparatus includes an emulsification and application nozzle comprising a diluent inlet, a binder inlet, a mixing section for emulsifying the diluent and the binder, and a spray nozzle for applying the binder/diluent emulsion to the fibers. The method includes supplying a binder stream, supplying a diluent stream, emulsifying the binder with the diluent and immediately applying the emulsion to the fibers. The method further includes flushing the binder/diluent emulsion using the diluent at the end of a binder application run to prevent curing of the emulsion and clogging of the apparatus. The binder/diluent emulsion can be applied to the fibers either in the blowline or downstream of the blowline, such as in the blender. A method and apparatus are also disclosed for producing fire-retardant boards in which a fire-retardant chemical, such as an ammonium polyphosphate, is applied to the fibers downstream of the refiner and upstream of the mat-former. Finally, a fire-retardant board product is disclosed that is made in accordance with the foregoing described methods and apparatuses.

13 Claims, 2 Drawing Sheets

U.S. PATENT DOCUMENTS

| | | | |
|---|---|---|---|
| 3,949,904 | 4/1976 | Hendrickson | 222/135 |
| 3,964,689 | 6/1976 | Horvath, Jr. | 239/318 |
| 4,038,451 | 7/1977 | Brown | 428/274 |
| 4,193,701 | 3/1980 | Koch et al. | 366/159 |
| 4,209,433 | 6/1980 | Hse | 260/29.3 |
| 4,279,788 | 7/1981 | Lambuth | 260/9 |
| 4,293,456 | 10/1981 | Reischl | 260/9 |
| 4,354,762 | 10/1982 | Cantoni | 366/160 |
| 4,376,089 | 3/1983 | Bogner et al. | 264/109 |
| 4,396,673 | 8/1983 | Ball et al. | 428/326 |
| 4,402,896 | 9/1983 | Betzner et al. | 264/115 |
| 4,407,771 | 10/1983 | Betzner et al. | 264/115 |
| 4,435,234 | 3/1984 | Hunt | 156/62.4 |
| 4,453,670 | 6/1984 | Sirovy | 239/117 |
| 4,472,230 | 9/1984 | Scahs et al. | 156/307.3 |
| 4,514,255 | 4/1985 | Maxwell et al. | 162/9 |
| 4,576,771 | 3/1986 | Sholl et al. | 264/109 |
| 4,609,513 | 9/1986 | Israel | 264/122 |
| 4,701,373 | 10/1987 | Fuchs et al. | 428/326 |
| 4,871,477 | 10/1989 | Dimanshteyn | 252/609 |
| 4,971,728 | 11/1990 | Vandersall | 252/603 |
| 5,064,710 | 11/1991 | Gosz | 428/182 |

OTHER PUBLICATIONS

Wilson, James. "Isocyanate Adhesives as Binders for Composition Board", *Adhesives Age,* May 1981, pp. 41–44.

Chapman, Kelvin, "Improved Uniformity in Medium Density Fiberboard", *Proceedings of Thirteenth Washington State Univ. Symposium on Particleboard,* Apr. 1979, pp. 237–253.

Loew, G. and Sachs, H., "Isocyanate as a Binder for Particleboard", *Proceedings of Eleventh Washington State Univ. Symposium on Particleboard,* Mar. (1977), pp. 473–492.

Gran, G., "Blowline Blending in Dry Process Fiberboard Production", *Proceedings of Sixteenth Washington State Univ. Symposium on Particleboard,* Mar. (1982), pp. 261–267.

Hammock, L., "Resin Blending of MDF Fiber", *Proceedings of Sixteenth Washington State Univ. Symposium on Particleboard,* Mar. (1982), pp. 245–259.

FIRE-RETARDANT SYNTHRETIC BOARD PRODUCT

This is a division of application Ser. No. 07/668,068, filed Mar. 12, 1991, pending, which is a continuation-in-part of Ser. No. 07/326,226, filed Mar. 20, 1989, now U.S. Pat. No. 5,093,058, and entitled APPARATUS AND METHOD OF MANUFACTURING SYNTHETIC BOARDS.

BACKGROUND OF THE INVENTION

The present invention relates to an apparatus and method of manufacturing synthetic boards and fire-retardant synthetic boards from cellulosic or lignocellulosic furnish materials using an organic binder. The present invention also relates to a fire-retardant synthetic board product comprising cellulosic or lignocellulosic furnish materials, an organic binder and fire-retardant chemicals.

Many synthetic board products are manufactured using a thermosetting binder, heat and pressure to reconsolidate refined cellulosic and/or lignocellulosic furnish materials into a unitary finished board product. Examples of board manufacturing processes are shown in U.S. Pat. No. 2,757,115 to Heritage and U.S. Pat. No. 4,407,771 to Betzner et al. Basically, furnish material, such as wood, is reduced to fibers of the desired size by a refiner, mixed with a binder and other chemicals, such as release and sizing agents, partially dewatered, formed into mats and compressed between heated platens in a hot press to form a board product of the desired thickness and density. In many current processes, the binder is applied to a rapidly moving stream of the fibers of the fibers as it exits the refiner, in the so-called "blowline" of the process equipment. Alternatively, the binder may be added in the blender or elsewhere downstream of the refiner.

A wide variety of binder systems have been utilized in the production of synthetic boards, including various thermosetting organic binders, such as isocyanates, polyisocyanates, urea formaldehydes, phenolics, melamines and various mixtures thereof. Isocyanat and polyisocyanate binders have advantages over urea formaldehyde binders in that boards with greatly improved weather resistance can be produced. Processing time can typically be substantially reduced using isocyanate and polyisocyanate binders, rather than standard phenolic binders. Although specially formulated phenolic binders can decrease the processing time, the cost of these specialty binders makes their use less attractive. Additionally, urea formaldehyde binders tend to produce formaldehydes, and phenolic binders tend to produce both formaldehydes and free phenols around the press area, which can cause significant health problems.

Heretofore, successful application of isocyanate binders in fiberboard manufacture has been limited due to many factors. First, there is often difficulty in achieving adequate distribution at low dosage rates. Second, many systems require the use of an expensive release agent-containing binder or must utilize a caul plate system which allows external release agent application. These problems usually result in increased production costs and/or inferior finished board product quality.

Many of the binder systems used today in board manufacture include an organic isocyanate binder which is specially mixed with a variety of diluent/extender agents to enhance binder distribution. These admixtures must also have a relatively long pot life to avoid premature curing, which can clog the binder delivery system. Unfortunately, even quite stable admixtures tend to deposit reaction products in process lines during use, and especially when use is interrupted. Both problems usually necessitate expensive machine downtime to unclog or replace components of the binder delivery system.

In systems utilizing isocyanate binders, the binder is typically formulated into an aqueous emulsion long before application to the furnish. Since the binder is highly reactive, the temperature during and after emulsification must be kept relatively low to avoid prereaction of the binder before it is applied to the furnish materials. Water-cooled addition devices, such as the nozzle described in U.S. Pat. No. 4,402,896 to Betzner et al., have been used, but require a constant supply of cooling water and are still subject to clogging.

Another problem associated with specialty binders and their mixing equipment is that if the binder is not completely removed from the binder delivery system at the end of a production run, the binder will usually cure and clog the system. Therefore, there is a need for a binder delivery system which assures that all of the binder is removed therefrom to avoid these problems.

Additionally, release agents are often added to the binder system to avoid sticking of the board to platens or caul plates during processing. However, these specially formulated binders are typically proprietary to a particular manufacture and are prohibitively expensive for large-scale fiberboard manufacturing operations. Accordingly, there is a need for a process and apparatus which can utilize basic nonproprietary isocyanate and other binder compounds and release agents.

SUMMARY OF THE INVENTION

It is, therefore, an object of the present invention to provide a method of producing a synthetic board from cellulosic or lignocellulosic materials wherein standard, nonproprietary, inexpensive and readily available isocyanate, polyisocyanate and similar binders can be utilized, thus obviating the need for expensive specialty chemical formulations.

It is also an object of the present invention to provide an apparatus for producing a synthetic board wherein standard binders and release agents can be utilized.

It is a further object of the present invention to provide a method and apparatus for forming a binder emulsion immediately upstream from the point of application to the wood fibers, thus allowing the use of isocyanates or polyisocyanates which do not form emulsions having extended stabilities or pot life.

It is also an object of the present invention to provide a method and apparatus for binder application wherein the emulsion is cooled by the diluent.

It is an object of the present invention to provide a method and apparatus for applying the binder which would avoid periodic plugging of the process equipment and the binder system.

It is also an object of the present invention to provide a method and apparatus for flushing the binder from the nozzle at the end of a production run so that the binder does not cure within the nozzle and clog the same.

Another object of the invention is to provide a method and apparatus as aforesaid which includes a new and improved method and apparatus for producing a fiberboard that is fire-retardant.

Still another object of the invention is to provide a method and apparatus as aforesaid which produces a fire-retardant fiberboard having size, strength, water-resistance and other characteristics comparable to those of standard fiberboard.

Another object is to provide a method and apparatus as aforesaid capable of producing an exterior grade fiberboard that is fire-retardant.

Another object is to provide a cellulosic or lignocellulosic fiberboard product that is fire-retardant and yet has size, strength, water-resistance and other characteristics comparable to those of standard fiberboard.

According to one aspect of the present invention, there is provided an apparatus adapted for mixing a binder stream and a diluent stream and applying the resulting product stream to the fibers in the production of synthetic boards from cellulosic fibers, the apparatus comprising:

- binder inlet means for receiving a first stream containing a binder;
- diluent inlet means for receiving a second steam containing a diluent;
- mixing means fluidly connected to the binder inlet means and the diluent inlet means for mixing the first stream and the second stream to produce a third stream comprising a product stream containing the binder and the diluent; and
- outlet means positioned proximate the mixing means and fluidly connected to the mixing means for immediately applying the product stream to the fibers.

According to another aspect of the present invention, there is provided an apparatus for producing synthetic boards from a cellulosic material, comprising:

- refining means for extracting fibers from a cellulosic material;
- conduit means connected to the refiner means for conveying the fibers along the fiber flow path;
- binder application means for mixing a binder and a diluent to form a binder/diluent mixture and immediately mixing the binder/diluent mixture with the fibers in the fiber flow path;
- dryer means for partially dewatering the fiber/binder mixture;
- forming means for creating a mat of the dewatered fiber/binder mixture; and
- heated pressing means for compressing the fibers and curing the binder in the mat for forming a consolidated board product.

According to yet another aspect of the present invention, there is provided a method of blending a binder with cellulosic fibers in the manufacture of synthetic boards from cellulosic fibers, the method comprising:

- conveying cellulosic fibers in a first stream;
- conveying a binder in a second stream;
- conveying a diluent in a third stream;
- merging the second stream and the third stream to produce a fourth stream; and
- immediately thereafter merging the fourth stream and the first stream to apply the binder and the diluent to the fibers.

According to a further aspect of the present invention, there is provided a method of producing synthetic boards from a cellulosic material, comprising the steps of:

- extracting hot and wet fibers from a cellulosic material;
- transporting the hot and wet fibers in a first stream;

- transporting separate second and third streams comprising a binder and a diluent, respectively, generally toward the first stream;
- merging the second and third stream to form a fourth stream;
- emulsifying the binder and the diluent in the fourth stream;
- immediately after emulsifying, applying the binder/diluent emulsion in the fourth stream to the hot and wet fibers in the first stream;
- partially dewatering the hot and wet fibers;
- forming the partially dewatered fibers into a mat; and
- compressing the mat in a heated press to cure the binder to form a consolidated board product.

The present invention further relates to an apparatus and method for the production of fire-retardant fiberboard. Such boards have traditionally been manufactured by a post-production impregnation treatment of the boards with a suitable fire-retardant chemical. In order to achieve a board which conforms to the British Standard Class 1 (as set out in BS476: Part 7: 1987) by this method, it is necessary to vacuum/pressure impregnate the boards. Fire-retardant boards produced by such post-production treatments suffer from the disadvantage that since the treatments are aqueous, thickness swell of the boards of up to 10% is common. Furthermore, substantial reduction in internal bond strength results from these processes. Thus, the boards produced by post-manufacturing treatments are of inferior quality, as compared to an otherwise comparable, but non-fire-retardant board.

U.S. Pat. No. 3,874,990 to Surdyk discloses a method for producing a flame retardant particle-board or chipboard in which the flame retardant chemicals are added during production of the particle board, prior to mat-forming, and comprise alkaline borate chemicals and flame retardant phosphoric acid-dicyandiamide-formaldehyde resin. The alkaline borate chemicals are added to the wood chips as a dry powder. Such a method does not lend itself to applications in the field of fiberboard production as it would be extremely difficult to achieve a good dispersion of a powder with the fine fiber used. Therefore, there is a need for an apparatus and method for producing a fire-retardant fiberboard in which the fire-retardant compound is incorporated into the board during its production and the product board has the desirable physical characteristics of standard fiberboard, as well as excellent fire-retardant characteristics.

According to a further aspect, there is provided an apparatus for producing synthetic fire-retardant boards from a cellulosic material comprising:

- refining means for extracting fibers from a cellulosic material;
- conduit means connected to the refiner means for conveying the fibers along the fiber flow path;
- binder application means for mixing a binder and a diluent to form a binder/diluent mixture and immediately mixing the binder/diluent mixture with the fibers in the fiber flow path;
- dryer means for partially dewatering the fiber/binder mixture;
- forming means for creating a mat of the dewatered fiber/binder mixture;
- liquid fire-retardant application means for introducing fire-retardant liquid onto the cellulosic material located upstream of the forming means; and heated pressing means for compressing the fibers and curing the binder in the mat for forming a consolidated fire-retardant board product.

According to yet a further aspect, there is provided a method of producing fire-retardant synthetic boards from a cellulosic material, comprising the steps of:

extracting hot and wet fibers from a cellulosic material;

transporting the hot and wet fibers in a first stream;

transporting separate second and third streams comprising a binder and a diluent, respectively, generally toward the first stream;

merging the second and third streams to form a fourth stream;

emulsifying the binder and the diluent in the fourth stream;

immediately after emulsifying, applying the binder/diluent emulsion in the fourth stream to the hot and wet fibers in the first stream;

partially dewatering the hot and wet fibers;

introducing fire-retardant liquid onto the cellulosic material;

forming the partially dewatered fibers into a mat; and compressing the mat in a heated press to cure the binder to form a consolidated board product.

The present invention includes a method and apparatus for producing a synthetic board from cellulosic or lignocellulosic fibers, preferably wood fibers, wherein a standard thermosetting binder, preferably an isocyanate or polyisocyanate binder, is emulsified and immediately applied to the fibers before consolidation of the fibers into a mat or finished board product. The apparatus includes a binder emulsification and application nozzle comprising a diluent inlet, a binder inlet, a mixing section proximate such inlets for emulsifying the diluent and the binder, and a spray nozzle at the outlet from the mixing section for applying the binder/diluent emulsion to the fibers in a fiber stream proximate the outlet and upstream of the forming mat in the board forming process. The method includes supplying a binder stream, supplying a diluent stream, merging the two streams, emulsifying the binder with the diluent and immediately thereafter applying the emulsion to the fiber stream. The method further includes flushing the mixing section and nozzle with the diluent stream at the end of a production run to remove the binder from the mixing section and nozzle to prevent curing of the binder emulsion and clogging of the mixing section and nozzle. In the apparatus of the present invention, the nozzle can be used to apply the emulsified binder to the fiber stream either in the refiner, the blowline or downstream of the blowline, such as in the blender, of the board forming apparatus.

The method may also include introducing a fire-retardant liquid into the fiber stream as part of the board forming process. The apparatus may also include means for applying a fire-retardant liquid to the fiber stream.

According to a further aspect, the invention comprises a fire-retardant, water-resistant synthetic board product comprising a mixture of hot and wet cellulosic fibers, an isocyanate binder and a liquid fire-retardant compound that has been compressed under heat and pressure to form the board product.

DESCRIPTION OF DRAWINGS

The invention will now be described more particularly with reference to the accompanying drawings. In the drawings.

DETAILED DESCRIPTION OF PREFERRED EMBODIMENTS

Embodiments Producing Boards Having Optimum Water Resistance

The present invention is intended for use in the production of reconstituted products made from cellulosic or lignocellulosic materials, and in particular, the production of fiberboard from wood fibers. The invention is also intended for use in the production of fiberboard having fire-retardant characteristics.

Figure 1:
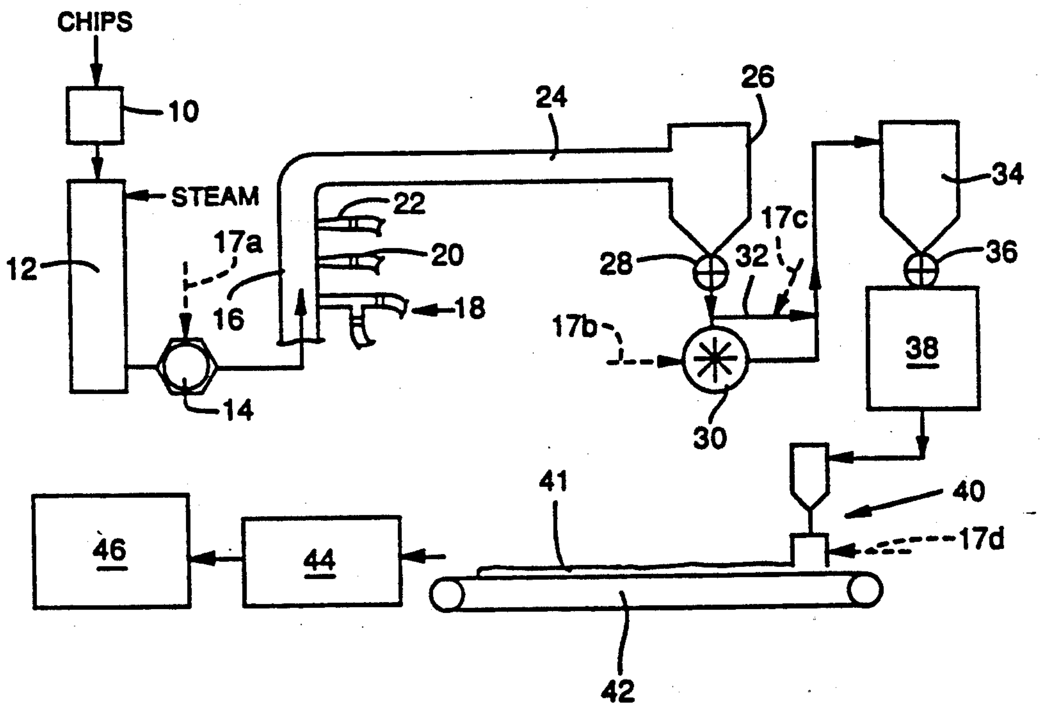
FIG. 1 is a schematic diagram showing the process and apparatus in accordance with the present invention.

As shown in FIG. 1, pieces of wood, such as chips, are fed into a plug feeder 10 for delivery to a digester 12, where they are subjected to steam and high pressure to soften the chips and break down the lignin therein. The cooked chips are transferred to a refiner 14 where they are separated into their constituent fibers, such as between uni- or bi-directional rotating discs.

The hot and wet fibers exit refiner 14 with steam in a rapidly moving continuous stream which is transported through a so-called "blowline" 16, where the binder and other desired compounds, such as release and sizing agents, are typically added. The binder is preferably a material selected from the group consisting of monomeric isocyanates, oligomeric isocyanates, and mixtures thereof having a functionality of at least 2. In addition, other conventional thermosetting binders may be used.

Aqueous emulsions of the binder and other additives are well-suited to blowline injection for several reasons. First, a large portion of the heat energy available in the blowline is absorbed in raising the temperature of the applied emulsions since the specific heat of water is higher than many of the other substances being added. Second, the water-to-water solvent compatibility between the wood fibers and the additive emulsion is excellent and helps assure good flow and distribution of the binder. Third, deposits of the additive emulsion on the wall of the blowline are minimized due to the presence of a continuous film of water condensate, with which the additive emulsions are also compatible. Fourth, the great turbulence within the blowline results in a scouring action which tends to keep the blowline wall clean, providing those adhering substances are also water compatible. Lastly, the residence time in the blowline is so short that most chemical reactions, such as curing of the binder, have insufficient time and energy to move very far toward reaction products.

A binder emulsion and application nozzle assembly 18 in accordance with the present invention is connected to blowline 16 for emulsifying the isocyanate binder with a diluent and applying the resulting emulsion to the fibers as they pass through blowline 16. Conventional nozzles 20 and 22 are also plumbed to blowline 16 for applying release and sizing agents to the fibers. Alternatively, the isocyanate binder, release agent and sizing agents may be added at other locations in the process, as will be described below.

Upon entering blowline 16, the steam and the fibers undergo a rapid drop in pressure and temperature, but travel therethrough in less than about 1 second. The velocity of the fibers through a typical blowline has been reported to be approximately 325 feet per second. There is extreme turbulence in blowline 16, which provides excellent mixing of additives, such as the binder, with the fibers.

After exiting blowline 16, the fibers enter a dryer 24 where they are partially dewatered. A first cyclone 26 and an air lock 28 are provided to separate the fiber from the dryer airstream. The fibers next pass to a blender 30 wherein the isocyanate binder, sizing, release agents or other desired materials can be mixed with the fibers, if desired. If all desired compounds have already been added, the fibers can be directed through a bypass chute 32 and go directly to a second cyclone 34 with an air lock 36 and then into a fiber storage bin 38. Fiber storage bin 38 provides fibers to one or more forming head apparatuses 40 which are used to dispense a forming mat of fibers 41 onto a forming belt 42. Forming mat 41 is deaerated by one or more prepressees 44 and then compressed to the final pressed thickness by a hot press 46 wherein the binder is cured to form the desired board product.

In general, the binder can be added to the fibers in any suitable location in the board forming apparatus upstream of forming mat 41. Alternative locations where the binder can be added to the fibers are designated by dashed arrows 17*a–d* in FIG. 1. For example, the binder may be added using the nozzle assembly of the present invention in any of the following locations: refiner 14; blender 30; bypass chute 32 or forming head apparatuses 40. Similarly, the sizing and release agents can be added, separately or together, in the various locations in the board forming apparatuses, including: plug feeder 10, digester 12, refiner 14, blowline 16, blender 30 or bypass chute 32.

Figure 2:
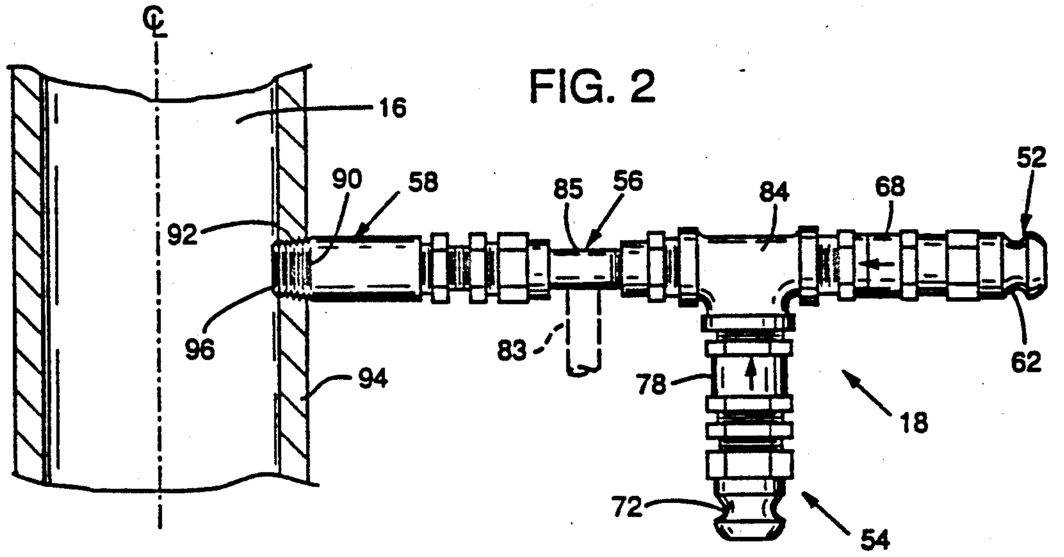
FIG. 2 is a side view of a nozzle in accordance with the present invention mounted on a blowline of a fiberboard manufacturing process.
Figure 3:
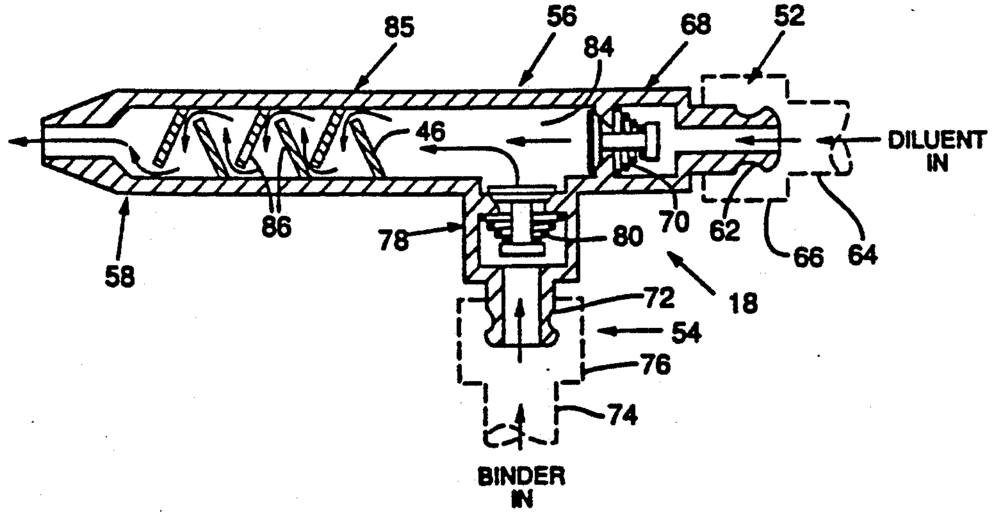
FIG. 3 is a schematic view of the nozzle in accordance with the present invention.

Referring to FIGS. 2 and 3, nozzle assembly 18 comprises a diluent inlet 52, a binder inlet 54, a mix section 56 for emulsifying diluent and binder and a spray nozzle 58 adapted for connection to a blowline 16 for spraying the emulsion on the fibers. A stream of water or other diluent is introduced through diluent inlet 52, and a stream of a binder, which can be isocyanate, polyisocyanate or other suitable thermosetting binder, is introduced through binder inlet 54.

Diluent inlet 52 includes a coupling 62, such as a quick disconnect coupling shown, for connection to a diluent supply line 64 with an appropriate coupling 66 through which water or other suitable diluent is delivered to nozzle assembly 18. A pressure relief check valve 68 for diluent inlet 52 is operated by a control spring 70 and is threadedly connected to coupling 62. Diluent check valve 68 prevents backflow from mix section 56 into diluent supply line 64. In addition, diluent check valve 68 will only open to allow diluent into mix section 56 when the pressure of the water stream is above a certain minimum pressure, for example, 15 psi. This assures that there will be no admixing of water and binder until the water stream has achieved proper operating pressure, such as by the use of an appropriate metering pump (not shown). It also assures that the flow of diluent into nozzle assembly 18 will stop immediately upon stopping the flow of the diluent stream or upon a drop in the pressure of the stream. Suitable check valves are available from the NuPro Company of Willoughby, Ohio.

Although alternative diluents, such as propylene carbonate or furfural, can be used under various conditions, water has long been used to reduce the viscosity of binders and thus improve distribution. The water also serves as a thermal buffer of the binder. This is particularly significant for those applications utilizing blowline addition of isocyanates. Since there is a constant flow of relatively cool (less than ambient temperature) diluent water through nozzle assembly 18, the temperature to which the binder is subjected during emulsification is also less than ambient, which prevents precuring. No additional cooling of the emulsion, such as provided by a cooling water jacket, is required.

Binder inlet 54 similarly includes a coupling 72 for connection to a binder supply line 74 with a coupling 76 through which binder is delivered to nozzle assembly 18. In the preferred embodiment, the binder is standard technical grade isocyanate or polyisocyanate. A pressure relief check valve 78 for binder inlet 54 includes a control spring 80 and is threadedly connected to coupling 72. Binder check valve 78 operates as above to prevent backflow from mix section 56 into binder supply line 74. Binder check valve 78 also prevents the admixing of water and binder before the binder stream has achieved its proper operating pressure, or if the flow of the binder stream has been stopped or if the pressure of the binder stream drops below a proper operating pressure.

Figure 4:
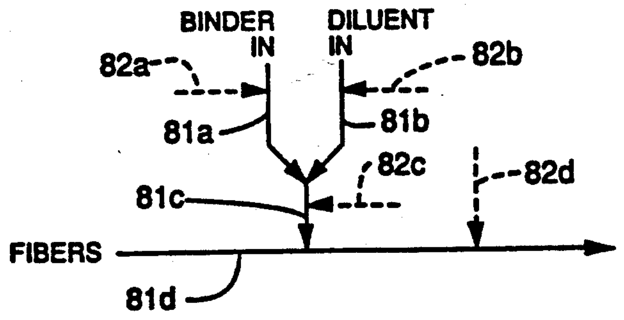
FIG. 4 is a schematic drawing showing the positions of entry of binder, diluent, and other agents to the fiber flow path.

Additional compounds, such as release agents, sizing agents, etc., may be applied to the fibers, if desired. Referring to FIG. 4, release agents and sizing agents may be added, separately or together, to diluent stream 81*a*, binder stream 81*b*, combined binder/diluent stream 81*c* or directly to fiber stream 81*d*, as shown by dashed lines 82*a*–82*d*, respectively. If the additional compounds are to be added to combined binder/diluent stream 81*c*, a third inlet 83 (shown by dashed lines in FIG. 2) can be plumbed to mix section 56 of nozzle assembly 18 for introducing such compounds into mix section 56. In this way, the additional compounds will be merged with the binder/diluent immediately before application to the fibers.

Mix section 56 includes an intersection tee 84 which is threadedly attached to the outlets of diluent check valve 68 and binder check valve 78 for receiving the binder stream and the diluent stream. Tee 84 is also threadedly connected to an in-line mix section 85 equipped with a plurality of interior baffles 86 which cause mixing and emulsion of the binder with the diluent. The exact number and configuration of baffles 86 has not been found to be critical, as long as sufficient mixing results. A plastic baffled-style motionless mixer insert sized for insertion into in-line mix section 85 and sold by TAH Industries of Imalyston, N.J., under the name Kinetic Mixer, has been found to give good results.

Spray nozzle 58 is threadedly attached to in-line mix section 85 for applying the diluent/binder emulsion to the fibers passing through blowline 16. Spray nozzle 58 is provided with external threads 90 for attachment to mating internal threads 92 in wall 94 of blowline 16. Spray nozzle 58 is mounted so that only a small tip portion 96 of the nozzle 90 extends into blowline 16 and is subjected to the abrasive atmosphere therein. Due to the abrasive atmosphere of blowline 16 and to avoid any possible interaction with the emulsion, it has been determined that spray nozzle 58 should be constructed out of stainless steel or other suitable material.

It has also been determined that a spray nozzle obtained from Spraying Systems Company of Wheaton, Ill., and sold under the trademark FULLJET gives good results. This nozzle tip includes an integral interior spiral vane mixer which produces a full cone spray pattern for good distribution of the emulsion on the fibers. It has also been determined that a nozzle I.D. of 0.245 inches is preferred to maintain proper backpressure in nozzle assembly 18. Nozzle assembly 18 is typically operated at an emulsion flow rate of approximately 5 gallons per minute and a pressure of between 80 and 125 psi, although some applications may require other application rates and parameters.

In a working embodiment, blowline 16 has an interior diameter of about 6 inches. Thus, the distance between the point of emulsification of the binder and the point of application to the fibers in blowline 16 is very small, approximately 4 inches. This relatively short distances helps assure that the binder emulsion does not cure before application to the fibers.

In accordance with the present invention, a method of and means for flushing binder and emulsion out of nozzle assembly 18 is also provided. This flushing is necessary to avoid leaving the emulsion in mix section 56 or spray nozzle 58 where it could quickly cure and plug nozzle assembly 18. To flush nozzle assembly 18 at the end of a production run, the binder pump should be turned off to stop the flow of binder. This causes binder check valve 78 to close. The water stream is allowed to continue to flow for a few seconds (3-5 seconds) to flush out any residual emulsion. Preferably, the binder stream should be shut off before fiber stream flow past spray nozzle 58 has ended to avoid buildup of binder in blowline 16.

Application of the aqueous emulsions of standard isocyanate and polyisocyanate through nozzle assembly 18 into blowline 16 results in a practical and economical means of producing a superior fiberboard product, especially a medium density, water-resistant fiberboard suitable for exterior use. The ready availability of the binders are of great significance to a commercial fiberboard production facility.

Embodiments Producing Boards Having Optimum Fire Retardance

Fire-retardant fiberboard is advantageously produced by the above-described method and apparatus, with the introduction of an additional step whereby a fire-retardant chemical in aqueous solution is added to the wood or other cellulosic or lignocellulosic material. Ammonium polyphosphate has been found to be a suitable compound for this purpose when used with an isocyanate binder. Ammonium polyphosphate is known as a fire-retardant for the treatment by spraying, dipping, etc. of fabrics. However, it has not, to Applicants' knowledge, been used successfully as a fire retardant in fiberboard. Attempts have been made by the Applicants to produce a fire-retardant fiberboard using urea formaldehyde as the binder system, together with ammonium polyphosphate as the fire-retardant compound. The product was found to have poor internal bonding, probably due to chemical reaction between the binder and fire-retardant, resulting in inferior fire-retardancy, water resistance, strength and other characteristics. Applicants have now found, surprisingly, that use of the same fire-retardant chemical with an isocyanate binder system gives a product board having superior physical characteristics and with water resistance and strength similar to comparable nonfire-retardant boards. It has been found that the fire-retardant compound may be added in the range of 7-15% solid ammonium polyphosphate to oven dry weight of wood where an isocyanate is used as the binder. Addition of higher amounts of the fire-retardant compound, when used with an isocyanate binder, has been found to result in a finished fiberboard whose tensile strength is unacceptably lowered. The preferred range is 7-10% solid ammonium polyphosphate to oven dry weight of wood.

The fire-retardant chemical may be added to the wood chips or fibers at any suitable location in the board forming apparatus upstream of forming mat 41 (FIG. 1). Suitable points are: plug feeder 10; digester 12; refiner 14, blowline 16 or blender 30. Introduction of the chemical is via a standard spray nozzle, for example, a 1 inch FULLJET (trademark) nozzle. The fire-retardant liquid may be added to the fiber stream either before or after addition of the isocyanate binder emulsion to the fiber stream. If desired, one of auxiliary nozzles 20, 22 may be used for this purpose. Alternatively, a stream of the fire-retardant liquid may be merged with the stream of emulsified isocyanate binder in nozzle assembly 18, for example, by using inlet 83 to nozzle mix section 85. The fire-retardant liquid may also be added to either the diluent in inlet passage 64 or the binder in inlet passage 74 to the nozzle assembly 18.

The fire-retardant fiberboard meets the same technical specifications, including size, strength, density and water-resistance characteristics, as the nonfire-retardant fiberboard produced by the method and apparatus according to the invention. With respect to its fire-retardant properties, the fire-retardant fiberboard described herein is certified to Class 1 surface spread of flame in accordance with the class definitions given in British Standard 476: Part 7: 1987. The test assesses ignition characteristics and the extent to which the product surface spreads flames laterally. Materials are classified according to performance as Classes 1 to 4 in descending order of performance. The fire-retardant fiberboard is suitable for use, but is not limited to use, in any of the following applications: ceilings, wall linings, partitioning in building and shopfitting, display panels for the shopfitting and exhibitions industry, shipbuilding applications, general purpose building panels where greater fire integrity is specified or required whilst still retaining a surface suitable for finishing.

Although preferred embodiments of the present invention have been shown, it is obvious that many modifications and variations of the present invention are possible in the light of the above teachings. It is, therefore, to be understood that the present invention may be practiced otherwise than as specifically described.

We claim:

1. A synthetic fire-retardant board product made from a cellulosic material by:

extracting hot and wet fibers from a cellulosic material;

transporting the hot and wet fibers in a first stream;

transporting separate second and third streams comprising a binder and a diluent, respectively, generally toward the first stream;

merging the second and third streams to form a fourth stream;

emulsifying the binder and the diluent in the fourth stream;

immediately after emulsifying, applying the binder/-diluent emulsion in the fourth stream to the hot and wet fibers in the first stream;

partially dewatering the hot and wet fibers;

introducing fire-retardant liquid onto the cellulosic material;

forming the partially dewatered fibers into a mat; and compressing the mat in a heated press to cure the binder to form a consolidated board product.

2. The product of claim 1 wherein the fire-retardant liquid comprises an aqueous solution of a fire-retardant compound.

3. The product of claim 1 wherein the fire-retardant liquid comprises an aqueous solution of ammonium polyphosphate.

4. The product of claim 1 wherein the fire-retardant liquid is added in the range of 7–15% solid fire-retardant compound to oven dry weight of wood.

5. The product of claim 1 wherein the fire-retardant liquid comprises an aqueous solution of ammonium polyphosphate and the emulsified binder comprises an emulsified isocyanate.

6. The product of claim 5 wherein the first stream is a stream of wood fibers and the solution of ammonium polyphosphate is added to the wood fiber stream at a rate in the range of 7–15% by weight solid ammonium polyphosphate to oven dry weight to wood.

7. The product of claim 6 wherein the ammonium polyphosphate is added to the wood fiber stream at a rate in the range of 7–10% by weight of solid ammonium polyphosphate to oven dry weight of wood.

8. A synthetic fire-retardant water-resistant board product made by mixing a stream of hot and wet cellulosic fibers with (1) an isocyanate binder emulsified with a diluent and (2) an aqueous solution of ammonium polyphosphate, before forming the mixture into a mat, then forming the mat into a board through the application of heat and pressure.

9. The product of claim 8 wherein the weight of solid ammonium polyphosphate in the mixture comprises 7–15% of the oven dry weight of cellulosic fibers in the mixture.

10. A synthetic, fire-retardant and water-resistant board product comprising a mixture of hot and wet cellulosic fibers, an isocyanate binder and a liquid fire-retardant compound that has been compressed into the board product by the application of heat and pressure.

11. The product of claim 10 wherein the cellulosic fibers are wood fibers.

12. The product of claim 10 wherein the isocyanate binder is an emulsification of isocyanate and a diluent.

13. The product of claim 10 wherein the fire-retardant compound is an aqueous solution of ammonium polyphosphate.

* * * * *